US008869622B2

(12) United States Patent
(10) Patent No.: US 8,869,622 B2
(45) Date of Patent: Oct. 28, 2014
Fujii et al.

(54) CAPACITIVE ELECTROMECHANICAL TRANSDUCER APPARATUS AND METHOD FOR ADJUSTING ITS SENSITIVITY

(75) Inventors: Kazunari Fujii, Kawasaki (JP); Takahiro Akiyama, Kawasaki (JP); Ayako Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 13/390,680

(22) PCT Filed: Aug. 5, 2010

(86) PCT No.: PCT/JP2010/004945
§ 371 (c)(1), (2), (4) Date: Feb. 15, 2012

(87) PCT Pub. No.: WO2011/021358
PCT Pub. Date: Feb. 24, 2011

(65) Prior Publication Data
US 2012/0146454 A1 Jun. 14, 2012

(30) Foreign Application Priority Data
Aug. 19, 2009 (JP) ................................ 2009-189613

(51) Int. Cl.
*G01L 9/12* (2006.01)
*B06B 1/02* (2006.01)

(52) U.S. Cl.
CPC .................................... *B06B 1/0292* (2013.01)
USPC ............................................... 73/718; 73/724

(58) Field of Classification Search
USPC .................................................... 73/700–756
See application file for complete search history.

(56) References Cited

U.S. PATENT DOCUMENTS

| | | | | |
|---|---|---|---|---|
| 8,256,302 | B2 * | 9/2012 | Fujii et al. | 73/724 |
| 2005/0203397 | A1 | 9/2005 | Degertekin | |
| 2007/0164631 | A1 | 7/2007 | Adachi | |
| 2007/0215964 | A1 | 9/2007 | Khuri-Yakub | |
| 2012/0135531 | A1 * | 5/2012 | Silver | 436/116 |
| 2012/0256519 | A1 * | 10/2012 | Tomiyoshi et al. | 310/300 |
| 2012/0256520 | A1 * | 10/2012 | Torashima et al. | 310/300 |
| 2012/0262770 | A1 * | 10/2012 | Torashima et al. | 359/199.2 |
| 2012/0266682 | A1 * | 10/2012 | Torashima et al. | 73/715 |
| 2013/0071964 | A1 * | 3/2013 | Kato et al. | 438/50 |
| 2013/0302934 | A1 * | 11/2013 | Kato et al. | 438/53 |
| 2013/0313663 | A1 * | 11/2013 | Kato et al. | 257/416 |
| 2014/0007693 | A1 * | 1/2014 | Torashima et al. | 73/658 |
| 2014/0010052 | A1 * | 1/2014 | Torashima et al. | 367/181 |

FOREIGN PATENT DOCUMENTS

| | | | |
|---|---|---|---|
| JP | 2003-500955 | A | 1/2003 |
| JP | 2004-125514 | A | 4/2004 |
| JP | 4401958 | B2 | 1/2010 |

* cited by examiner

*Primary Examiner* — Andre Allen
(74) *Attorney, Agent, or Firm* — Canon USA, Inc. IP Division

(57) ABSTRACT

A technology that makes it possible to adjust, through processing, an output signal sent from a capacitive electromechanical transducer apparatus such as a CMUT upon reception of an elastic wave is provided.

A capacitive electromechanical transducer apparatus 100 includes cells 102 that include a first electrode 104 and second electrodes 106, each of which is disposed so as to be opposite the first electrode 104 with a cavity 105 therebetween. In the capacitive electromechanical transducer apparatus 100, at least one of the cells 102 includes a processed unit on which at least either addition of a material or removal of a material is performed as processing.

11 Claims, 6 Drawing Sheets

CAPACITIVE ELECTROMECHANICAL TRANSDUCER APPARATUS AND METHOD FOR ADJUSTING ITS SENSITIVITY

TECHNICAL FIELD

The present invention relates to a capacitive electromechanical transducer apparatus such as a capacitive ultrasonic transducer apparatus, and a method for adjusting the sensitivity of the capacitive electromechanical transducer apparatus.

BACKGROUND ART

Recently, capacitive electromechanical transducer apparatuses manufactured by performing a micromachining process have been studied actively. General capacitive electromechanical transducer apparatuses include cells that include a lower electrode, a vibrating membrane that is supported and arranged with a predetermined space from the lower electrode, and upper electrodes arranged on a surface of the vibrating membrane. These capacitive electromechanical transducer apparatuses are used as, for example, capacitive micromachined ultrasonic transducers (CMUTs).

A CMUT performs at least either conversion of an electric signal into an ultrasonic wave or conversion of an ultrasonic wave into an electric signal by using a lightweight vibrating membrane. A CMUT can be easily designed so as to have a wide frequency band property in both liquids and the air. A CMUT makes it possible to perform medical diagnoses that attain higher accuracy than previous medical diagnoses, and thus a CMUT is receiving attention as a promising technology. The principles of such a CMUT will be described. When an ultrasonic wave is transmitted, a voltage obtained by superimposing a minute alternating-current (AC) voltage on a direct-current (DC) voltage is applied across the lower and upper electrodes. As a result, the vibrating membrane is vibrated and an ultrasonic wave is generated. When an ultrasonic wave is received, the vibrating membrane is deformed by the ultrasonic wave, so that the capacitance formed between the lower and upper electrodes changes because of the deformation of the vibrating membrane and a signal resulting from the change in capacitance is detected. General capacitive electromechanical transducer apparatuses include a plurality of elements, in each of which a plurality of cells that are electrically connected to each other are electrically connected in parallel with each other. With such a configuration, the reception sensitivities of the elements may vary. A method in which sensitivity correction of the variations is performed has been proposed (see PTL 1). In this method, a control unit electrically adjusts an output signal in such a manner that the difference between output signals (the difference in sensitivity) resulting from conversion performed by ultrasonic detection elements becomes smaller.

The reception sensitivity of each of the cells or elements is inversely proportional to, for example, the square of the space (gap) between the upper and lower electrodes. Thus, if gaps between the upper and lower electrodes for the cells or elements vary, the reception sensitivity of the CMUT varies from cell to cell or from element to element. As a method for forming a gap for a capacitive electromechanical transducer apparatus, a method is generally used in which a sacrificial layer is arranged so as to have almost the same thickness as a desired interelectrode gap, a vibrating membrane is formed on the sacrificial layer, and then the sacrificial layer is removed to form the gap.

CITATION LIST

Patent Literature

PTL 1: Japanese Patent Laid-Open No. 2004-125514

SUMMARY OF INVENTION

When a capacitive electromechanical transducer apparatus in which a plurality of elements are arranged, each element including a plurality of cells electrically connected to each other, is used to detect an elastic wave such as an ultrasonic wave, variations in reception sensitivity among the elements lower the measurement accuracy. Thus, it is necessary to correct the reception sensitivity of each element. However, as described in PTL 1, if the structure that performs sensitivity correction through gain adjustment performed by a downstream circuit is used, the circuit needs to have a wide dynamic range. Furthermore, correction cannot be performed if variations greater than a predetermined level are present.

In light of the above-described problem, a capacitive electromechanical transducer apparatus, such as a CMUT, according to the present invention includes cells that include a first electrode and second electrodes, each of which is disposed so as to be opposite the first electrode with a cavity therebetween. In the capacitive electromechanical transducer apparatus, at least one of the cells includes a processed unit on which at least either addition of a material or removal of a material has been performed as processing.

Moreover, in light of the above-described problem, a method for adjusting a sensitivity of a capacitive electromechanical transducer apparatus that includes cells that include a first electrode and second electrodes, each of which is disposed so as to be opposite the first electrode with a cavity therebetween, performs, as processing, at least either addition of a material or removal of a material onto or from at least one of the cells to adjust an output signal sent from the at least one of the cells upon reception of an elastic wave (typically, an ultrasonic wave).

In the present invention, at least either addition of a material or removal of a material is performed onto or from at least one of the cells, and thus the reception sensitivities of the cells or those of the elements with respect to an elastic wave such as an ultrasonic wave can be adjusted (that is, an output signal generated upon reception of, for example, an ultrasonic wave can be adjusted), or the variations in reception sensitivity among the elements can be reduced. For example, the reception sensitivities of the cells or elements can be made almost equal to each other by using a capacitive electromechanical transducer apparatus that includes a plurality of cells or in which a plurality of elements are arranged, each element including a plurality of cells electrically connected to each other. Moreover, processing is simple such as addition of a material or removal of a material, and thus processing can be relatively easily performed.

DESCRIPTION OF EMBODIMENTS

Figure 1A:
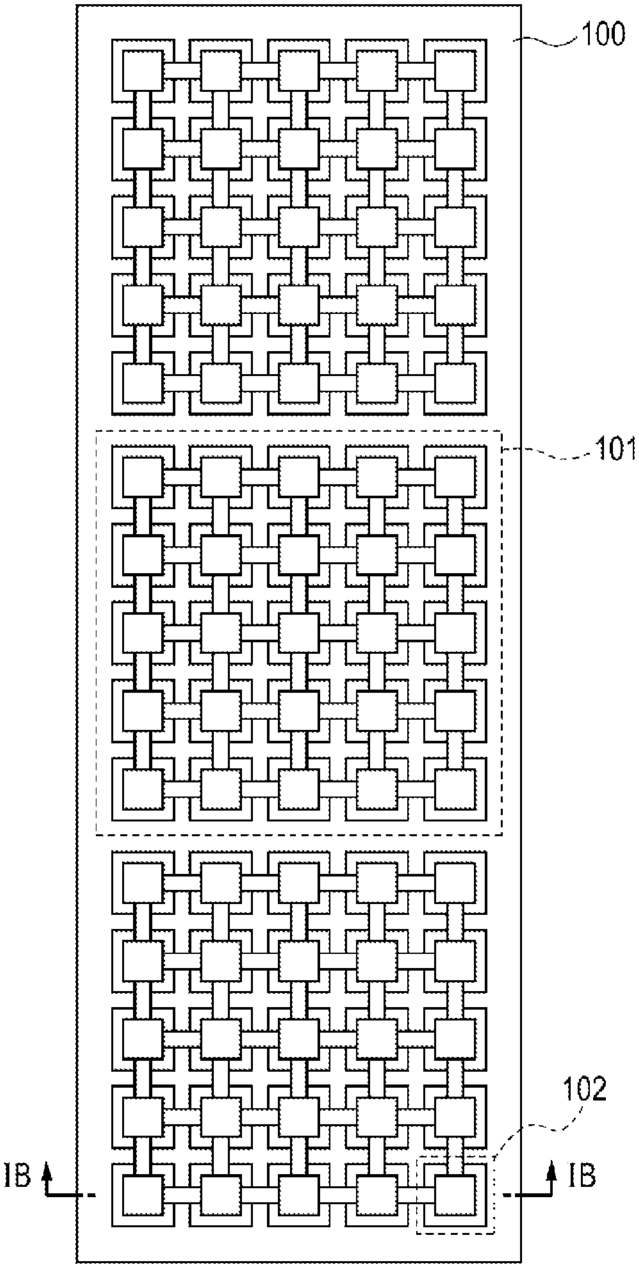
FIG. 1A is a plan view of the basic structure of a capacitive electromechanical transducer apparatus according to a first embodiment of the present invention before adjustment processing is performed.

In the following, embodiments of the present invention will be described. An important point regarding a capacitive electromechanical transducer apparatus and a method for adjusting a sensitivity according to the present invention is that at least either addition of a material or removal of a material is performed as processing onto or from at least one of the cells. In accordance with this idea, the basic structure of the capacitive electromechanical transducer apparatus and the basic flow of the method for adjusting a sensitivity according to the present invention are similar to the above-described structure and flow. In accordance with the basic structure and flow, the following embodiments can be realized. For example, a capacitive electromechanical transducer apparatus includes a plurality of elements, each of which includes a plurality of cells (see embodiments described below). The cells include a first electrode disposed on a substrate, second electrodes, each of which is disposed to be opposite the first electrode with a cavity therebetween, a vibrating membrane supporting the second electrodes, and supporting units that support the vibrating membrane (see the embodiments described below). The above-described processed unit can realize adjustment of the reception sensitivities of the cells or elements with respect to an elastic wave, reduction of variations in reception sensitivity among the elements with respect to an elastic wave, and the like. An elastic wave according to the present invention is a sound wave, an ultrasonic wave, an acoustic wave, or a photoacoustic wave, or may be an elastic wave generated inside a subject by irradiating the inside of the subject with light such as near infrared rays. The processed unit may be either a portion where a vibration-restraining film is arranged on the second electrode, a portion where a connection resistance between the cell and a cell that is electrically connected to the cell has been made high, a portion where a hole has been bored in part of the cell and the cavity has been made to have atmospheric pressure, or a portion where part of the cell has been removed (see the embodiments described below).

The second electrode used in the present invention may be composed of at least one material from among electric conductors including Al, Cr, Ti, Au, Pt, Cu, Ag, W, Mo, Ta, and Ni, semiconductors including Si, and alloys including AlSi, AlCu, AlTi, MoW, AlCr, TiN, and AlSiCu. Moreover, the second electrode may be arranged at least either on the top surface or on the back surface, or in the inside of the vibrating membrane. If the vibrating membrane is composed of an electric conductor or a semiconductor, the vibrating membrane may be formed to also function as the second electrode. The first electrode used in the present invention may also be composed of an electric conductor or a semiconductor similar to that of the second electrode. The material used in the first electrode may differ from that used in the second electrode. If the substrate is a semiconductor substrate such as a silicon substrate, the substrate may also function as the first electrode.

Moreover, if the capacitive electromechanical transducer apparatus includes a plurality of elements, each of which includes a plurality of cells, the number of cells to be processed can be determined in accordance with the reception sensitivity of each of the elements measured in advance with respect to, for example, an ultrasonic wave, and the cells can be processed by some processing method (a method in which application of a material is performed, a method in which laser beam processing is performed, or the like).

First Embodiment

Figure 1B:
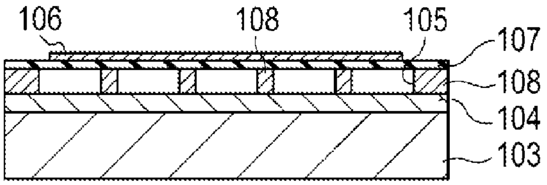
FIG. 1B is a sectional view taken along line IB-IB.

In the following, a capacitive electromechanical transducer apparatus according to a first embodiment of the present invention before sensitivity adjustment processing (the capacitive electromechanical transducer apparatus having been manufactured as originally planned) will be described with reference to the drawings. As shown in FIGS. 1A and 1B, a capacitive electromechanical transducer apparatus 100 includes a plurality of elements 101. In each of the elements 101, a plurality of cells 102 are electrically connected in parallel with each other. In FIG. 1A, 25 cells 102 are arranged in the element 101, which is a component; however, the number of the cells 102 is not limited thereto as long as there are one or more cells in the element 101. Moreover, the capacitive electromechanical transducer apparatus 100 includes three elements 101 arranged in one dimension; however, the elements 101 may be arranged in two dimensions. In the first embodiment, the cells 102 include a lower electrode 104 disposed on a substrate 103, upper electrodes 106, each of which is disposed so as to be opposite the lower electrode 104 with a predetermined cavity 105 therebetween, a vibrating membrane 107 supporting the upper electrodes 106, and supporting units 108 supporting the vibrating membrane 107. If the supporting units 108 are portions supporting the vibrating membrane 107, the supporting units 108 include portions composed of the same material as the vibrating membrane 107, the portions being formed integrally in a process in which the vibrating membrane 107 is formed. The lower electrode 104 is a common electrode in the capacitive electromechanical transducer apparatus 100, and the upper electrodes 106 of the cells 102 in each of the elements 101 are electrically connected to each other by wires of the same material as that of the upper electrodes 106. Here, the way in which the upper electrodes 106 are connected is not limited thereto and may be determined so as to comply with specifications.

In the first embodiment, the height of the cavity 105 is 100 nm. It is preferable that the height of the cavity 105 have a value in the range from 10 nm to 500 nm. It is preferable that the length of a side of the cavity 105 have a value in the range from 10 micrometers to 200 micrometers. The vibrating membrane 107 is composed of SiN but may be composed of another insulating material. The pressure in the cavities 105 is maintained at a pressure that is lower than atmospheric pressure, and the vibrating membrane 107 has a convex shape (, which will be described later with reference to FIG. 6B). In the first embodiment, the vibrating membrane 107, the lower electrode 104, and the upper electrodes 106 have a square shape but may instead have a circular shape or a polygonal shape. The cavity 105 of a cell 102 also has a square shape in, for example, FIGS. 1A and 1B but may instead also have a shape other than a square shape.

In a cell 102, the capacitance between the upper electrode 106 and the lower electrode 104 changes when the vibrating membrane 107 is made to vibrate by vibrations of an elastic wave coming from the outside. The upper electrodes 106 and the lower electrode 104 of each element 101 are connected to a receiving circuit (not shown), and the receiving circuit converts a change in capacitance formed between the upper electrodes 106 and the lower electrode 104 of the cells 102 within each element 101 into a voltage signal.

When medical diagnoses are performed by using signals sent from a plurality of elements 101, it is desirable that variations in reception sensitivity among the elements 101 be small. Thus, in the first embodiment, the reception sensitivity of each of the elements 101 is measured in advance and a vibration-absorbing agent is applied onto the top surfaces of some of the cells 102 in certain elements 101 of the capacitive electromechanical transducer apparatus 100 in accordance with the measured reception sensitivities of the elements 101. By performing such sensitivity adjustment processing, an output signal sent from each cell 102 upon reception of an ultrasonic wave or the like can be controlled or adjusted. The reception sensitivities of the elements 101 with respect to a sound wave or the like can be made almost equal to each other.

Figure 2A:
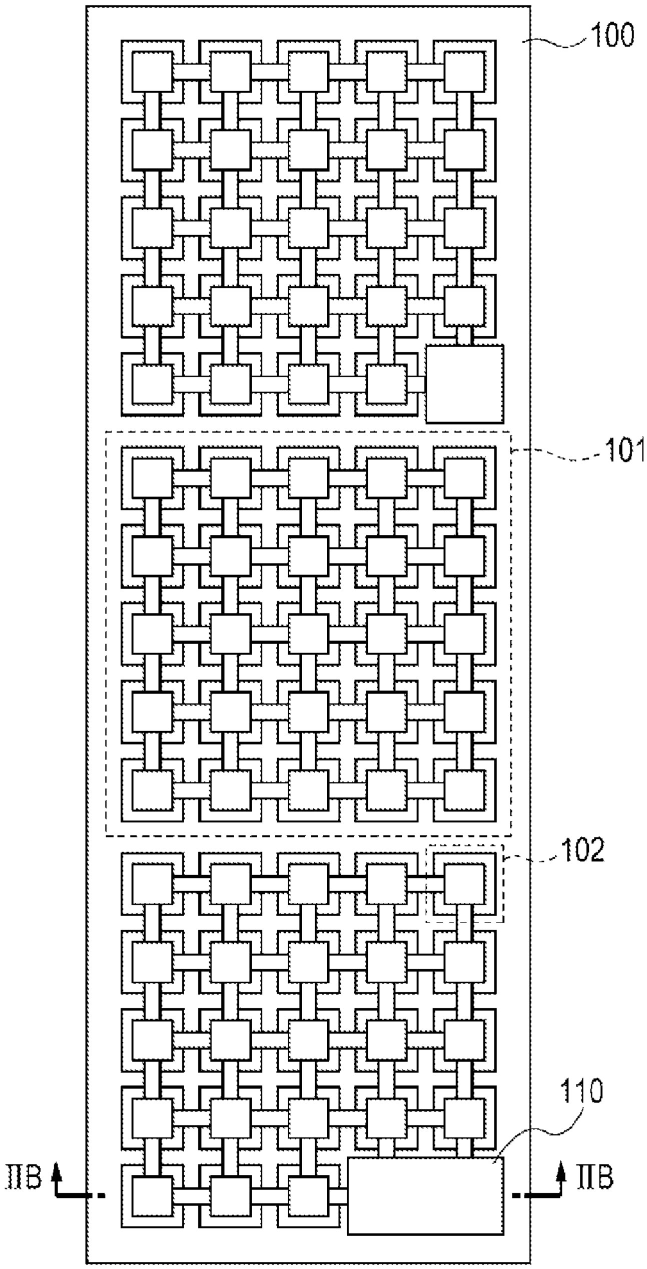
FIG. 2A is a plan view of the basic structure of a capacitive electromechanical transducer apparatus according to the first embodiment of the present invention after adjustment processing is performed.
Figure 2B:
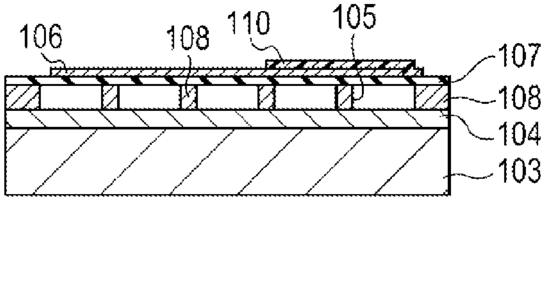
FIG. 2B is a sectional view taken along line IIB-IIB.
Figure 3A:
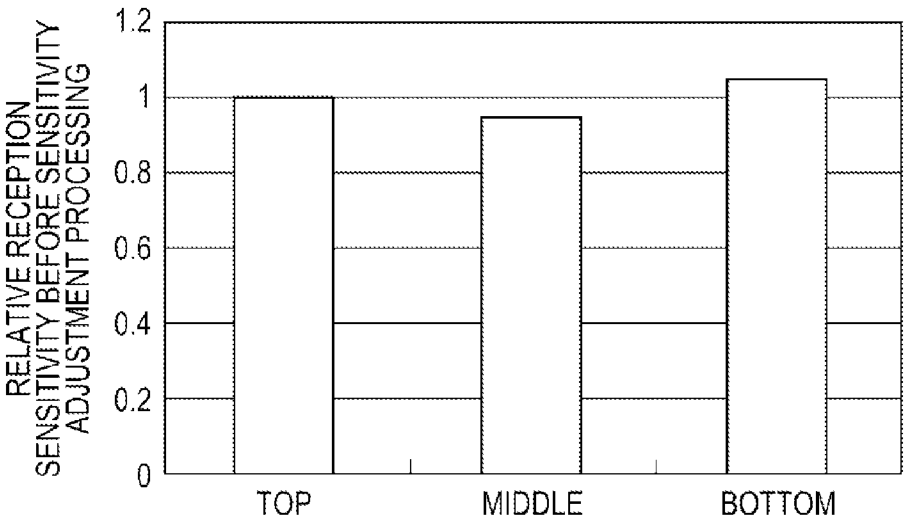
FIG. 3A is a graph showing the relative reception sensitivity of each element before sensitivity adjustment processing.
Figure 3B:
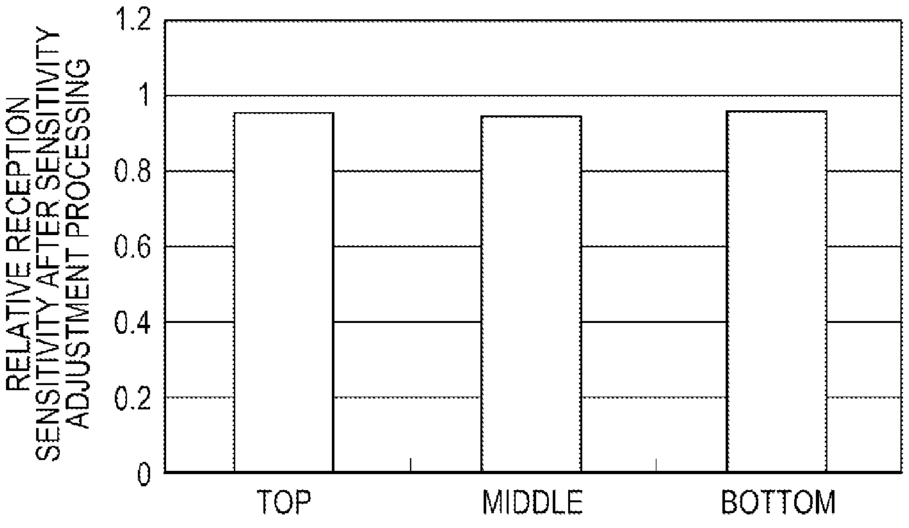
FIG. 3B is a graph showing the relative reception sensitivity of each element after sensitivity adjustment processing.

FIG. 2A shows a top view of the capacitive electromechanical transducer apparatus 100 whose reception sensitivity has been adjusted by performing such sensitivity adjustment processing, and FIG. 2B shows a sectional view taken along line IIB-IIB. In the first embodiment, for example, a vibration-absorbing agent 110 is an acrylic resin and is applied onto the top surface of a desired cell by a dispenser. The vibration of the vibrating membrane 107 caused by vibrations of a sound wave or the like coming from the outside can be reduced by applying the vibration-absorbing agent 110 whose spring constant is higher than that of the vibrating membrane 107. Moreover, the reception sensitivity of each element 101 can be adjusted by changing the number of cells 102 onto which the vibration-absorbing agent 110 is applied within the element 101. For example, if it is found out before the sensitivity adjustment processing that the ranking in terms of reception sensitivity of top, middle, and bottom elements 101 shown in FIG. 2A, from highest to lowest, is the bottom element 101, the top element 101, and the middle element 101, the following will be performed. That is, as shown in FIG. 2A, the number of cells 102 onto which the vibration-absorbing agent 110 is applied within each of the elements 101 increases in the order from the middle element 101, the top element 101, to the bottom element 101. As a result, the reception sensitivities of the elements 101 with respect to a sound wave or the like can be made almost equal to each other. In a case in which the reception sensitivity of the top element 101 before the sensitivity adjustment processing is set to 1, if it is found out that the relative reception sensitivity of the middle element 101 is 0.95 and that of the bottom element 101 is 1.05, the variation in reception sensitivity before the sensitivity adjustment processing is 10%. Here, as shown in FIG. 2A, the vibration-absorbing agent 110 is applied so as to have a predetermined thickness onto the top surfaces of two cells 102 of the bottom element 101, one cell 102 of the top element 101, and zero cells 102 of the middle element 101. As a result, the relative reception sensitivity of the top element 101 becomes 0.96, that of the middle element 101 is 0.95, and that of the bottom element 101 becomes 0.97. Compared to before the sensitivity adjustment processing, the variation in reception sensitivity, which was 10%, is reduced to 1.7%. Here, the top element 101 has 25 cells 102, and thus the relative reception sensitivity of the top element 101 is reduced by 0.04 every time the vibration-absorbing agent 110 is applied onto one of the cells 102 of the top element 101. In the case of the bottom element 101, the relative reception sensitivity of the bottom element 101 is reduced by 0.042 every time the vibration-absorbing agent 110 is applied onto one of the cells 102 of the bottom element 101. FIG. 3A shows the relative reception sensitivity of each of the elements 101 before the sensitivity adjustment processing, and FIG. 3B shows the relative reception sensitivity of each of the elements 101 after the sensitivity adjustment processing.

The precision of sensitivity correction depends on the number of cells 102 included in each element 101. Thus, sensitivity adjustment can be performed with higher accuracy by increasing the number of cells 102 in the element 101. In the first embodiment, the vibration-absorbing agent 110 is applied on the premise that an output signal sent from a cell 102 can be completely blocked by applying the vibration-absorbing agent 110 onto the cell 102 so as to have a predetermined thickness. If the vibration-absorbing agent 110 is an acrylic resin, it is desirable that the vibration-absorbing agent 110 be applied so as to have a thickness of about a few millimeters in order to completely stop vibration of the vibrating membrane 107. A similar effect can be obtained by adjusting the number of cells 102 to be processed, in accordance with a restrained ratio based on the thickness of the vibration-absorbing agent 110. For example, when the restrained ratio for an output signal is 50% (this figure can be obtained by performing measurement in advance), a similar effect can be obtained by applying the vibration-absorbing agent 110 onto the top surfaces of four cells 102 of the bottom element 101, two cells 102 of the top element 101, and zero cells 102 of the middle element 101. Moreover, the vibration-absorbing agent 110 is not limited to an acrylic resin, and may be a material that is capable of reducing vibration of the vibrating membrane 107. The vibration-absorbing agent 110 may have a multilayer structure formed by different materials. In this way, according to the first embodiment, the reception sensitivity of each element 101 can be easily adjusted with high accuracy by adjusting the reception sensitivity of the element 101 by adjusting the number of cells 102 to be processed.

Moreover, the position of a cell 102 to be processed within the element 101 can be taken into account. For example, if it has already been found out that the restrained ratio for an output signal depends on the distance between a cell 102 and the center of the element 101 including the cell 102, cells 102 to be processed can be determined by taking the number of the cells 102 and the position of each of the cells 102 into account and the reception sensitivity of each of the elements 101 with respect to a sound wave or the like can be adjusted. The above-described capacitive electromechanical transducer apparatus may also be designed in such a manner that the capacitive electromechanical transducer apparatus can also transmit an elastic wave to the outside. Reception and transmission of an elastic wave is performed as described in the background art. In the first embodiment, it is desirable that at least the reception sensitivity of each of the elements 101 can be adjusted, and thus the above-described sensitivity adjustment processing is performed. However, as a matter of course, the transmission efficiency of each of the elements 101 is different after the sensitivity adjustment processing.

Second Embodiment

Figure 4A:
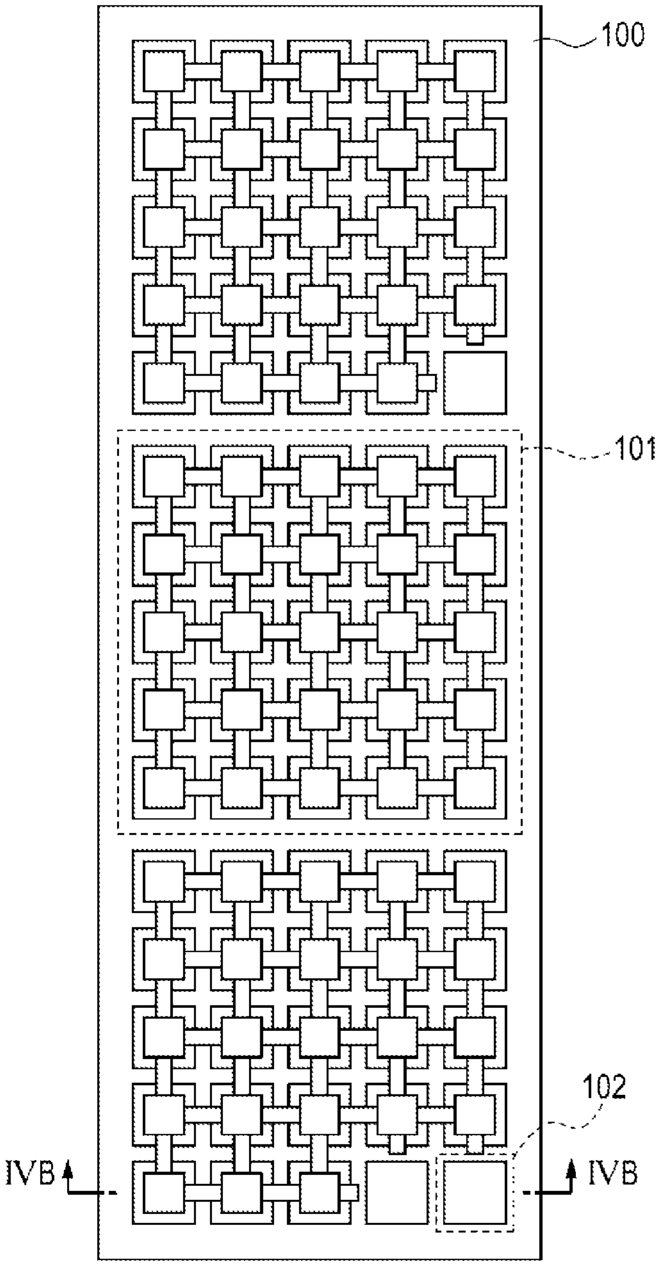
FIG. 4A is a plan view of the basic structure of a capacitive electromechanical transducer apparatus according to a second embodiment of the present invention.
Figure 4B:
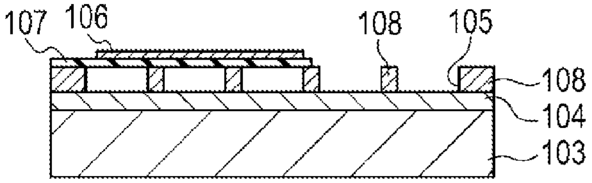
FIG. 4B is a sectional view taken along line IVB-IVB.

A capacitive electromechanical transducer apparatus according to a second embodiment will be described. The basic structure of the capacitive electromechanical transducer apparatus according to the second embodiment is similar to that shown in the first embodiment. In the second embodiment, the vibrating membrane and upper electrodes of some of the cells are removed within the elements in accordance with the reception sensitivity of each of the elements measured in advance. As a result, an intensity of an output signal sent from the cells upon reception of an ultrasonic wave or the like can be reduced and the reception sensitivities of a plurality of elements can be made almost equal to each other. FIG. 4A shows a top view of a capacitive electromechanical transducer apparatus 100 whose reception sensitivity has been adjusted by a sensitivity adjustment processing method according to the second embodiment. FIG. 4B shows a sectional view taken along line IVB-IVB. Selected cells 102 are processed by removing the vibrating membranes 107 and upper electrodes 106 of the selected cells 102 by performing laser beam machining, etching processing, or the like. In the processed cells 102, changes in capacitance can be avoided, the changes being caused by vibrations of a sound wave or the like coming from the outside. Thus, the reception sensitivity of each element 101 can be adjusted by changing the number of cells 102 whose vibrating membranes 107 and upper electrodes 106 are to be removed within the element 101. Here, as shown in FIG. 4A, the vibrating membranes 107 and upper electrodes 106 of two cells 102 of the bottom element 101, one cell 102 of the top element 101, and zero cells 102 of the middle element 101 are removed. As a result, the relative reception sensitivity of the top element 101 becomes 0.96, that of the middle element 101 is 0.95, and that of the bottom element 101 becomes 0.97. Compared to before the sensitivity adjustment processing, the variation in reception sensitivity is reduced to 1.7%. FIG. 3A shows the relative reception sensitivity of each of the elements 101 before the sensitivity adjustment processing, and FIG. 3B shows the relative reception sensitivity of each of the elements 101 after the sensitivity adjustment processing.

In the second embodiment, the upper electrodes 106 and vibrating membranes 107 of the selected cells 102 are removed; however, only the upper electrodes of the selected cells 102 may be removed. The second embodiment is similar to the first embodiment in terms of other points.

Third Embodiment

Figure 5A:
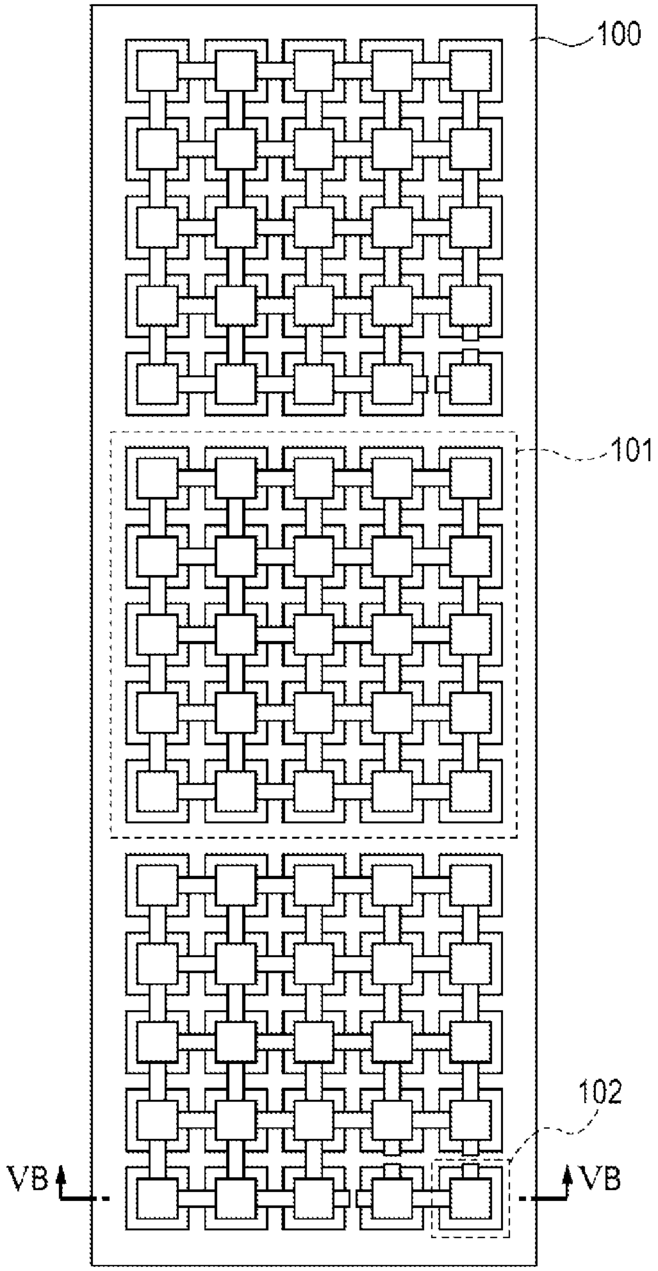
FIG. 5A is a plan view of the basic structure of a capacitive electromechanical transducer apparatus according to a third embodiment of the present invention.
Figure 5B:
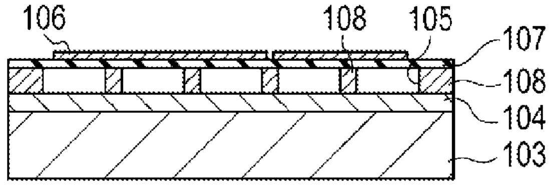
FIG. 5B is a sectional view taken along line VB-VB.

A capacitive electromechanical transducer apparatus according to a third embodiment will be described. The basic structure of the capacitive electromechanical transducer apparatus according to the third embodiment is also similar to that shown in the first embodiment. In the third embodiment, electrical connection between the upper electrodes of some cells within each element is cut in accordance with the reception sensitivity of the element measured in advance. As a result, an intensity of an output signal sent from the cells upon reception of a sound wave or the like can be reduced and the reception sensitivities of a plurality of elements with respect to a sound wave or the like can be made almost equal to each other. FIG. 5A shows a top view of a capacitive electromechanical transducer apparatus 100 whose reception sensitivity has been adjusted by a sensitivity adjustment processing method according to the third embodiment. FIG. 5B shows a sectional view taken along line VB-VB. Electrical connection between selected upper electrodes 106 is cut by performing laser beam machining, etching processing, or the like. The processed cells 102 are not electrically connected to other cells 102 within the element 101, and thus an intensity of an output signal caused by vibrations of a sound wave or the like coming from the outside can be reduced. Thus, the reception sensitivity of each element 101 can be adjusted by changing the number of cells 102 whose upper electrodes 106 are to be electrically disconnected within the element 101. Here, as shown in FIG. 5A, the upper electrodes 106 of two cells 102 of the bottom element 101 are electrically disconnected from the other cells 102, the upper electrode 106 of one cell 102 of the top element 101 is electrically disconnected from the other cells 102, and the upper electrodes 106 of zero cells 102 of the middle element 101 are electrically disconnected from the other cells 102. As a result, the relative reception sensitivity of the top element 101 becomes 0.96, that of the middle element 101 is 0.95, and that of the bottom element 101 becomes 0.97. Compared to before the sensitivity adjustment processing, the variation in reception sensitivity is reduced to 1.7%. FIG. 3A shows the relative reception sensitivity of each of the elements 101 before the sensitivity adjustment processing, and FIG. 3B shows the relative reception sensitivity of each of the elements 101 after the sensitivity adjustment processing.

The third embodiment is built on the premise that an output signal sent from a cell 102 whose upper electrode 106 has been electrically disconnected can be completely blocked. However, if a similar effect can be obtained by increasing the wire resistance between the upper electrodes 106, a similar effect can be obtained by adjusting the number of cells 102 to be processed, in accordance with the restrained ratio for an output signal. For example, in a case in which the restrained ratio for an output signal is 50% when the wire resistance is increased, a similar effect can be obtained by increasing the wire resistance for four cells 102 of the bottom element 101, two cells 102 of the top element 101, and zero cells 102 of the middle element 101. Methods for increasing the resistance include a method in which the width of a wire is reduced, a method in which the thickness of a wire is made smaller, and the like. The third embodiment is similar to the first embodiment in terms of other points.

Fourth Embodiment

Figure 6A:
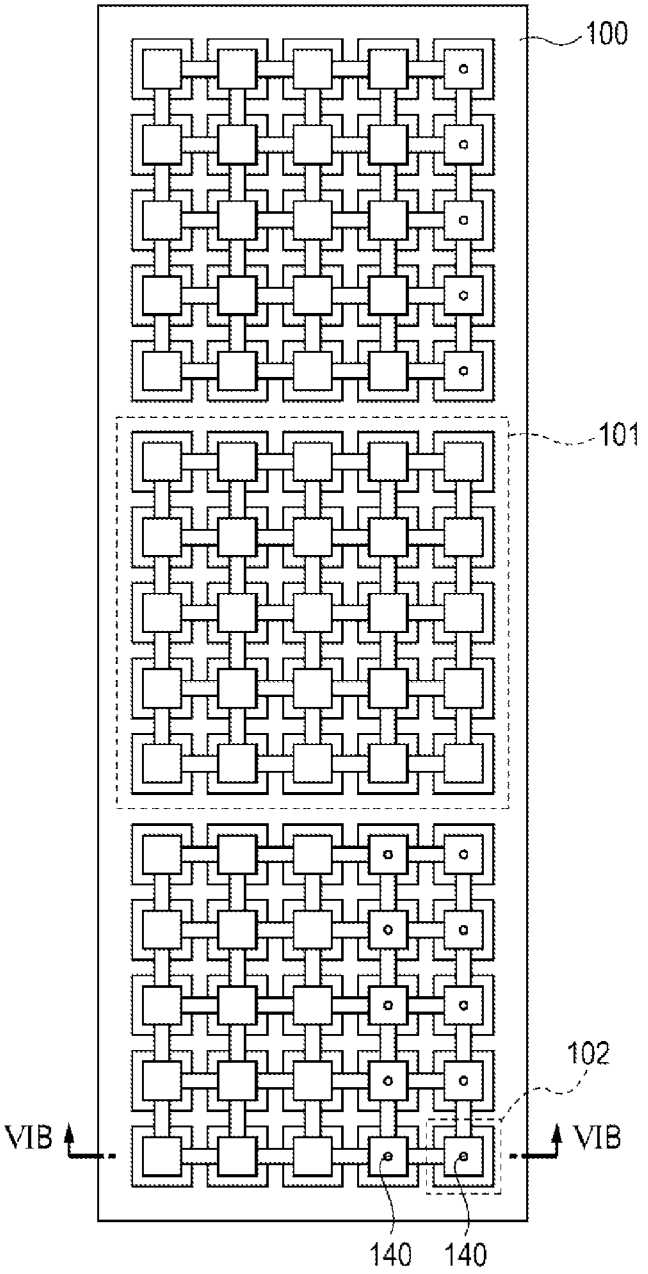
FIG. 6A is a plan view of the basic structure of a capacitive electromechanical transducer apparatus according to a fourth embodiment of the present invention.
Figure 6B:
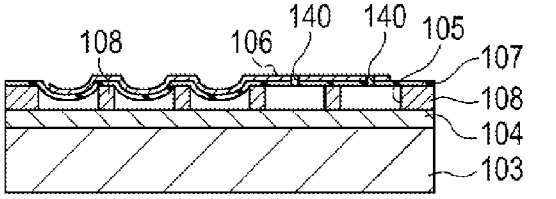
FIG. 6B is a sectional view taken along line VIB-VIB.

A capacitive electromechanical transducer apparatus according to a fourth embodiment will be described. The basic structure of the capacitive electromechanical transducer apparatus according to the fourth embodiment is also similar to that shown in the first embodiment. In the fourth embodiment, a hole is bored in part of the vibrating membrane of each of some cells within certain elements in accordance with the reception sensitivity of the element measured in advance. As a result, an intensity of an output signal sent from the cells upon reception of a sound wave or the like can be reduced and the reception sensitivities of a plurality of elements with respect to a sound wave or the like can be made almost equal to each other. FIG. 6A shows a top view of a capacitive electromechanical transducer apparatus 100 whose reception sensitivity has been adjusted by a sensitivity adjustment processing method according to the fourth embodiment. FIG. 6B shows a sectional view taken along line VIB-VIB. The pressure in the cavity 105 of a cell 102 before sensitivity adjustment processing is maintained at a pressure that is lower than atmospheric pressure, and the vibrating membrane 107 of the cell 102 has a convex shape as shown in the cells 102 on the left in the sectional view shown in FIG. 6B (here, the shape of the vibrating membrane 107 is slightly exaggerated for purposes of illustration). A hole 140, which is a through hole, is bored in part of the vibrating membrane 107 of each of some cells 102 having a cavity 105 whose inner pressure is maintained at a pressure that is lower than atmospheric pressure, by performing laser beam machining, etching processing, or the like, and the pressure in the cavity 105 becomes atmospheric pressure. By boring a hole, the shape of the vibrating membrane 107 becomes closer to that of a flat surface as shown in the cells 102 on the right in the sectional view shown in FIG. 6B. The flatter vibrating membrane 107 can reduce an intensity of an output signal caused by vibrations of a sound wave or the like coming from the outside to a greater degree than the vibrating membrane 107 having a convex shape before sensitivity adjustment processing. Thus, the reception sensitivity of each of the elements 101 can be adjusted by changing the number of cells 102 for which part of the vibrating membrane 107 is made to have the hole 140 within the element 101.

FIG. 6A shows a sensitivity adjustment method in a case in which the restrained ratio for an output signal sent from the cells 102 is 20%. In this case, the hole 140 is bored in part of the vibrating membrane 107 of each of ten cells 102 of the bottom element 101, part of the vibrating membrane 107 of each of five cells 102 of the top element 101, and part of the vibrating membrane 107 of each of zero cells 102 of the middle element 101. As a result, the relative reception sensitivity of the top element 101 becomes 0.96, that of the middle element 101 is 0.95, and that of the bottom element 101 becomes 0.97. Compared to before the sensitivity adjustment processing, the variation in reception sensitivity is reduced to 1.7%. FIG. 3A shows the relative reception sensitivity of each of the elements 101 before the sensitivity adjustment processing, and FIG. 3B shows the relative reception sensitivity of each of the elements 101 after the sensitivity adjustment processing. In the fourth embodiment, the hole 140 is bored in the center of the vibrating membrane 107 of each of certain cells 102; however, a similar effect can be obtained as long as processing is performed that makes the cavities 105 of certain cells 102 be open to the atmosphere. The fourth embodiment is similar to the first embodiment in terms of other points.

In the above-described first to fourth embodiments, for example, the reception sensitivity can be measured in the following manner. Elements of a capacitive electromechanical transducer apparatus are arranged to face ultrasonic-wave transmitting elements of a measurement apparatus in such a manner that the elements and the ultrasonic-wave transmitting elements have a predetermined relationship. The elements of the capacitive electromechanical transducer apparatus are in a state in which they can receive waves. The measurement apparatus is in a state in which the measurement apparatus can receive output signals sent from the elements. When a measurement operation starts, a predetermined ultrasonic wave is transmitted from the ultrasonic-wave transmitting elements. The predetermined ultrasonic wave is received by the elements of the capacitive electromechanical transducer apparatus. The measurement apparatus receives output signals sent from the elements, and measures the reception sensitivity of each of the elements. A method for performing processing on the cells is determined as described above and processing is executed in accordance with these measured values. If possible, feedback control of cell processing may be performed in accordance with the measured values while measurement is being performed. Moreover, some of or all of the above-described first to fourth embodiments may be combined and performed if the combination is basically possible. For example, application of the vibration-absorbing agent 110 in the first embodiment and processing of increasing a wire resistance between the upper electrodes 106 in the third embodiment may be performed together.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-189613, filed Aug. 19, 2009, which is hereby incorporated by reference herein in its entirety.

The invention claimed is:

1. A capacitive electromechanical transducer apparatus comprising:

cells each including a first electrode and second electrode which is opposite the first electrode with a cavity therebetween, wherein at least one of the cells includes an additional material compared with another cell of the cells or lacks a material compared with another cell of the cells.

2. The capacitive electromechanical transducer apparatus according to claim 1, wherein the capacitive electromechanical transducer comprises elements, and wherein each of the elements comprises more than one of the cells.

3. The capacitive electromechanical transducer apparatus according to claim 1, wherein the at least one of the cells includes the additional material so that reception sensitivities of the cells or elements with respect to an elastic wave are adjusted or a variation in reception sensitivity among the elements with respect to an elastic wave is reduced.

4. The capacitive electromechanical transducer apparatus according to claim 1, wherein the additional material is a vibration-restraining film arranged on the second electrode.

5. A method for adjusting a sensitivity of a capacitive electromechanical transducer apparatus, the method comprising:

performing, as processing, at least either addition of a material or removal of a material onto or from at least one of the cells, while leaving at least another cell being not subject to the processing.

6. The method according to claim 5, wherein the number of cells to be processed is determined in accordance with reception sensitivities of a plurality of elements measured in advance with respect to an elastic wave, each of the elements including more than one of the cells.

7. The method according to claim 5, wherein the processing step is performed so that an output signal sent from the at least one of the cells upon reception of an elastic wave is adjusted.

8. The capacitive electromechanical transducer apparatus according to claim 1, wherein a hole is formed in the at least one of the cells, or part of the second electrode has been removed.

9. A capacitive electromechanical transducer apparatus comprising:

a first cell, a second cell, and a third cell, each of the first cell, the second cell, and the third cell including a first electrode and a second electrode which is opposite the first electrode with a cavity therebetween, wherein an electrical connection resistance between the first cell and the second cell is higher than an electrical connection resistance between the second cell and the third cell.

10. The capacitive electromechanical transducer apparatus according to claim 9, wherein the capacitive electromechanical transducer comprises elements, and wherein one of the elements comprises the first cell, the second cell, and the third cell.

11. The capacitive electromechanical transducer apparatus according to claim 9, wherein the electrical connection resistance between the first cell and the second cell is higher than the electrical connection resistance between the second cell and the third cell so that reception sensitivities of the first cell, the second cell, and the third cell or the elements including the one of the elements, with respect to an elastic wave, are adjusted or a variation in reception sensitivity among the elements including the one of the elements with respect to an elastic wave is reduced.

* * * * *